(12) United States Patent
Miller et al.

(10) Patent No.: US 7,124,640 B1
(45) Date of Patent: Oct. 24, 2006

(54) THERMAL MOUNTING PLATE FOR HEATED PRESSURE TRANSDUCER

(75) Inventors: Craig E. Miller, Charlestown, MA (US); James M. Poulin, Derry, NH (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 11/180,370

(22) Filed: Jul. 13, 2005

(51) Int. Cl.
  *G01L 19/04* (2006.01)
(52) U.S. Cl. .............................. 73/708; 73/706; 73/756
(58) Field of Classification Search ........... 73/700–756
  See application file for complete search history.

(56) References Cited

U.S. PATENT DOCUMENTS

| | | | |
|---|---|---|---|
| 4,785,669 A | 11/1988 | Benson et al. | |
| 5,483,199 A | 1/1996 | Knudsen | |
| 5,625,152 A | 4/1997 | Pandorf et al. | 73/756 |
| 5,797,415 A * | 8/1998 | Nicholson et al. | 137/15.01 |
| 5,808,206 A * | 9/1998 | Pandorf et al. | 73/756 |
| 5,911,162 A | 6/1999 | Denner | 73/718 |
| 5,932,332 A | 8/1999 | Pandorf et al. | |
| 5,965,821 A | 10/1999 | Grudzien | |
| 6,029,525 A | 2/2000 | Grudzien | 73/718 |
| 6,105,436 A | 8/2000 | Lischer et al. | |
| 6,591,683 B1 | 7/2003 | Yutani et al. | |
| 6,612,176 B1 * | 9/2003 | Poulin et al. | 73/708 |
| 6,707,121 B1 | 3/2004 | De Moor et al. | |
| 6,733,501 B1 | 5/2004 | Levine | |
| 6,772,640 B1 | 8/2004 | Quigley et al. | |
| 2006/0070447 A1 * | 4/2006 | Agami | 73/708 |

* cited by examiner

*Primary Examiner*—Edward Lefkowitz
*Assistant Examiner*—Jermaine Jenkins
(74) *Attorney, Agent, or Firm*—McDermott Will & Emery LLP (57) ABSTRACT

A transducer assembly including a sensor housing, a heater shell located in the sensor housing, a heater operatively coupled to the heater shell, a sensor received in the heater shell, and an electronics assembly positioned within the sensor housing, outside of the heater shell, and adapted to receive signals from the sensor. The assembly also includes a mounting plate positioned within the sensor housing, outside of the heater shell. The mounting plate has arms extending therefrom and at least one attachment point where the electronics assembly is secured to the mounting plate. The arms are secured to the sensor housing, and the mounting plate includes apertures adjacent to the arms for impeding thermal conduction between the arms and the attachment point.

20 Claims, 9 Drawing Sheets

THERMAL MOUNTING PLATE FOR HEATED PRESSURE TRANSDUCER

FIELD OF THE DISCLOSURE

The present disclosure relates generally to pressure transducer assemblies. More particularly, the present disclosure relates to a pressure transducer assembly having improved thermal characteristics.

BACKGROUND OF THE DISCLOSURE

Various vapor deposition processes are known to be useful, for example, in the production of semiconductor products. These processes are typically used to deposit very thin layers of various substances including conductive, semiconductive and insulative materials onto a substrate. Vapor deposition processes typically require each deposited material to be transported to the deposition chamber in a gas state or vapor phase where it is condensed onto the work in process.

Efficient operation of such a deposition process requires precise control of the pressure of the gases or vapors used in the process. Where the deposit material in its vapor phase has a relatively low condensation temperature (i.e., well below room temperature), the pressure of the material may be controlled using pressure transducers operating at room temperature. However, where the gas state or vapor phase of a deposit material has a relatively high condensation temperature, i.e., above room temperature, to avoid condensation, such materials are heated and maintained above their condensation temperatures, and thus heated transducers are usually required for measuring the pressures of these hot gases and vapors. Heated pressure transducers are also often heated to prevent sublimation or precipitation of solid material. For example, as is well known, ammonium chloride ($NH_4Cl$) is a chemical by-product of processes for depositing layers of silicon nitride ($Si_3N_4$), and if the pressure and temperature drop too low the $NH_4Cl$ sublimates so that a solid salt forms on any exposed cool surfaces. To prevent such sublimation of $NH_4Cl$, these processes are often conducted at 150° C.

Figure 9:
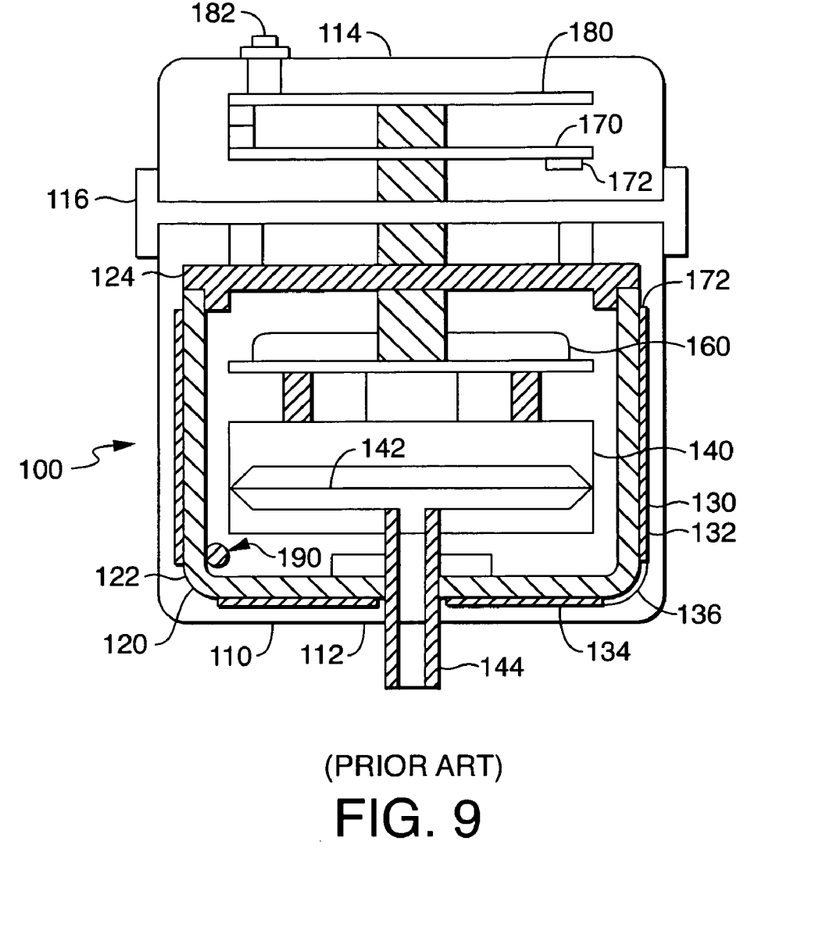
FIG. 9 is a sectional view of an exemplary embodiment of a pressure transducer assembly constructed in accordance with the prior art.

FIG. 9 shows a sectional view of a portion of a prior art heated pressure transducer assembly 100 of the type that is typically used in connection with relatively high temperature, vapor deposition processes. The transducer 100 includes several major components such as an external shell 110, a heater shell 120, a heater 130, a capacitive pressure sensor 140, a front end electronics assembly 160, a heater control electronics assembly 170, and an input/output (I/O) electronics assembly 180. As will be discussed in greater detail below, the transducer 100 generates an output signal indicative of a pressure measured by sensor 140.

For convenience of illustration, many mechanical details of the transducer 100, such as the construction of the sensor 140 and the mounting of the sensor 140 and the electronics assemblies 160, 170, 180, have been omitted from FIG. 9. However, heated capacitive pressure transducers such as transducer 100 are well known and are described for example in U.S. Pat. No. 5,625,152 (Pandorf); U.S. Pat. No. 5,911,162 (Denner); and U.S. Pat. No. 6,029,525 (Grudzien).

Briefly, the external shell 110 includes a lower enclosure 112, an upper electronics enclosure 114, and a joiner 116 that holds the enclosures 112, 114 together. The heater shell 120 is disposed within the lower enclosure 112 and includes a lower enclosure or can 122 and a cover 124. The sensor 140 and the front end electronics assembly 160 are disposed within the heater shell 120, while the heater control electronics assembly 170 and the I/O electronics assembly 180 are disposed within the upper electronics enclosure 114.

The heater 130 includes a barrel heater 132 wrapped around the can 122 and an end heater 134 that is secured to a bottom of the can and is electrically connected to the barrel heater 132 via wires 136. A temperature sensor (e.g., a thermistor) 190 is fixed to an internal surface of heater shell 120.

The sensor 140 includes a metallic, flexible, diaphragm 142 and a pressure tube 144 that extends from an area proximal to the diaphragm through the heater shell 120, and through the lower sensor enclosure 112. The lower, or external, end of tube 144 is generally coupled to a source of fluid (not shown). Pressure of fluid in the source is communicated via the tube 144 to the lower surface of diaphragm 142 and the diaphragm 142 flexes up or down in response to changes in pressure within the tube 144. The diaphragm 142 and a reference conductive plate of the sensor 140 form a capacitor, and the capacitance of that capacitor varies in accordance with movement or flexion of the diaphragm. Accordingly, that capacitance is indicative of the pressure within the tube 144. The front end electronics assembly 160 and the I/O electronics assembly 180 cooperatively generate an output signal representative of the capacitance of sensor 140 which is, of course, also representative of the pressure within the tube 144. The I/O electronics assembly 180 makes that output signal available to the environment external to transducer 100 via an electronic connector 182.

Figure 10:
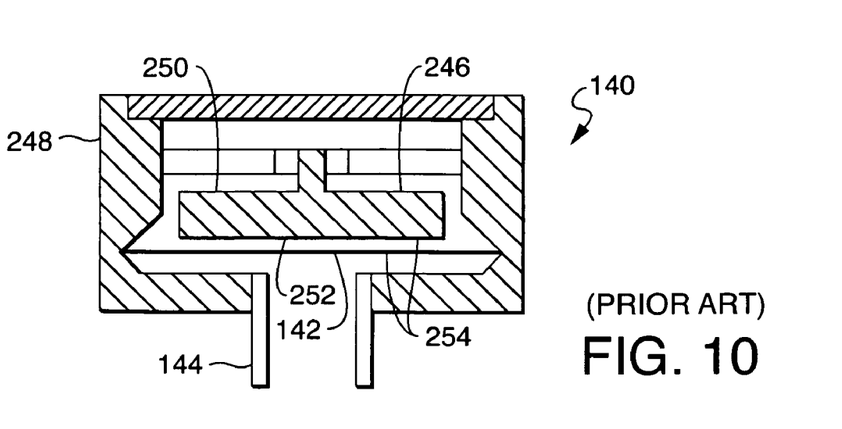
FIG. 10 is a sectional view of a capacitive pressure sensor the assembly of FIG. 9.

FIG. 10 shows one example of how a capacitive pressure sensor 140 can be constructed. Capacitive pressure sensors of the type shown in FIG. 10 are discussed in greater detail in U.S. Pat. No. 6,029,525 (Grudzien). The sensor 140 shown in FIG. 10 includes a circular, conductive, metallic, flexible diaphragm 142, a pressure tube 144, and an electrode 246. The electrode 246 and the diaphragm 142 are mounted within a housing 248. The electrode 246 includes a ceramic block 250 and a conductive plate 252. The ceramic block 250 is rigidly mounted to the housing 248 so that a bottom face of block 250 is generally parallel to, and spaced apart from, the diaphragm 142. The bottom face of block 250 is normally planar and circular. The conductive plate 252 is deposited onto the bottom face of block 250 and is also generally parallel to, and spaced apart from, the diaphragm 142. The conductive plate 252 and the diaphragm 142 form two plates of a variable capacitor 254. The capacitance of capacitor 254 is determined in part by the gap, or spacing between, the diaphragm 142 and the conductive plate 252. Since the diaphragm flexes up and down (thereby changing the spacing between diaphragm 142 and conductive plate 252) in response to pressure changes in tube 144, the capacitance of capacitor 254 is indicative of the pressure within tube 144.

FIG. 10 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Returning to FIG. 9, ideally, the output signal of transducer 100 varies only according to changes in the pressure of the fluid in tube 144. However, changes in the temperature of the transducer 100, or temperature gradients within the transducer 100, can affect the output signal. This is primarily due to the different coefficients of thermal expansion of different materials used to construct the sensor 140. A secondary effect relates to the temperature sensitive performance of the front end electronics 160. Accordingly, the accuracy of transducer 100 can be adversely affected by temperature changes in the ambient environment.

To minimize the adverse effect of changing ambient temperature, the temperature sensitive components of the transducer 100 (i.e., the sensor 140 and the front end electronics 160) are disposed within the heater shell 120, and in operation the heater 130 heats the heater shell 120 to a controlled, constant temperature. The heater 130 and the heater shell 120 essentially form a temperature controlled oven that maintains the temperature of the temperature sensitive components at a constant pre-selected value.

In operation, the heater control electronics assembly 170 applies an electrical signal to the heater 130 via wires 172. The heater control electronics assembly 170 normally includes components for monitoring the temperature of the heater shell 120 via temperature sensor 190 and adjusting the signal applied to the heater 130 so as to maintain the shell 120 at a constant temperature.

While it is necessary to heat the sensor 140, it is preferable to keep at least some, if not all, of the electronics assemblies 160, 170, and 180 at a relatively low temperature to decrease their failure rate. In the example shown in FIG. 9, the heater control electronics assembly 170 and the I/O electronics assembly 180 are kept at a relative low temperature. Therefore, the joiner 116 that holds the lower enclosure 112 to the upper enclosure 114 is made from a thermally conductive material, such as aluminum, to dissipate heat from the heater 130 and the heater shell 120 and away from the heater control electronics assembly 170 and the I/O electronics assembly. Alternatively, or in addition, the transducer may be provided with vents and thermal shunts to enable convective cooling between the lower enclosure 112 and the upper enclosure 114. Examples of vents and thermal shunts are shown in U.S. Pat. No. 5,625,152 (Pandorf et al.). Another method of cooling the upper enclosure 114 includes physically spacing, or separating, the upper enclosure 114 from the lower enclosure 112. Active cooling can also be employed using fans or thermoelectric coolers.

What is still desired is a new heated pressure transducer assembly having improved thermal characteristics which allow the electronics assemblies to be kept at a relatively low temperature to decrease their failure rate. Preferably, the transducer will be relatively compact, with the housing enclosures closely coupled. In addition, the transducer will preferably not require the use of active cooling devices or vents allowing direct airflow over electronics assemblies contained in the housing enclosures.

SUMMARY OF THE DISCLOSURE

The present disclosure provides a transducer assembly including a sensor housing, a heater shell located in the sensor housing, a heater operatively coupled to the heater shell, a sensor received in the heater shell, and an electronics assembly positioned within the sensor housing, outside of the heater shell, and adapted to receive signals from the sensor. The assembly also includes a mounting plate positioned within the sensor housing, outside of the heater shell. The mounting plate has arms extending therefrom and at least one attachment point where the electronics assembly is secured to the mounting plate. The arms are secured to the sensor housing, and the mounting plate includes apertures adjacent to the arms for impeding thermal conduction between the arms and the attachment point.

Among other aspects and advantages, the new and improved transducer assembly has improved thermal characteristics, wherein the electronics assembly is thermally isolated from the heated sensor by the mounting plate, such that the electronics assembly is kept at a relatively low temperature.

According to one aspect of the present disclosure, the sensor comprises a capacitive pressure sensor and the assembly further includes a tube connected to the pressure sensor and extending out of the heater shell and the sensor housing for connection to a source of fluid.

These and other features and advantages of the present disclosure will become more apparent to those of ordinary skill in the art after having read the following detailed descriptions of exemplary embodiments, which are illustrated in the attached drawing figures.

BRIEF DESCRIPTION OF DRAWINGS

Like reference characters designate identical or corresponding components and units throughout the several views.

DETAILED DESCRIPTION OF DISCLOSURE

The present disclosure provides a new and improved heated pressure transducer assembly 10. An exemplary embodiment of the assembly 10 is shown in FIGS. 1–5. The assembly 10 generally includes a sensor housing 12, a heater shell 14 located in the sensor housing 12, a heater 16 operatively coupled to the heater shell 14, a sensor 18 received in the heater shell 14, and an electronics assembly 20 positioned within the sensor housing 12, outside of the heater shell 14, and adapted to receive signals from the sensor 18. The assembly also includes a mounting plate 400 positioned within the sensor housing 12, outside of the heater shell 14. The mounting plate 400 has arms 402 extending therefrom and at least one attachment point 404 where the electronics assembly 20 is secured to the mounting plate 400. The arms 402 are secured to the sensor housing 12, and the mounting plate 400 includes apertures 406 for impeding thermal conduction between the arms 402 and the attachment point 404.

Among other aspects and advantages of the present disclosure, the new and improved transducer assembly 10 has improved thermal characteristics, wherein the electronics assembly 20 is thermally isolated from the heated sensor 18 by the mounting plate 400 and insulation 60, such that the electronics assembly 20 is kept at a relatively low temperature. This is helpful in extending the life, and reliability of the electronics assembly 20 and components thereof.

In the exemplary embodiment of the transducer assembly 10 shown in FIGS. 1–5, the sensor comprises a capacitive pressure sensor 18 and the assembly 10 further includes a tube 22 connected to the pressure sensor 18 and extending out of the heater shell 14 and the sensor housing 12 for connection to a source of fluid. It should be understood however, that the present disclosure is not limited to use with a pressure sensor 18, but can be used for thermally isolating electronics in other types of heated sensors.

Figure 6:
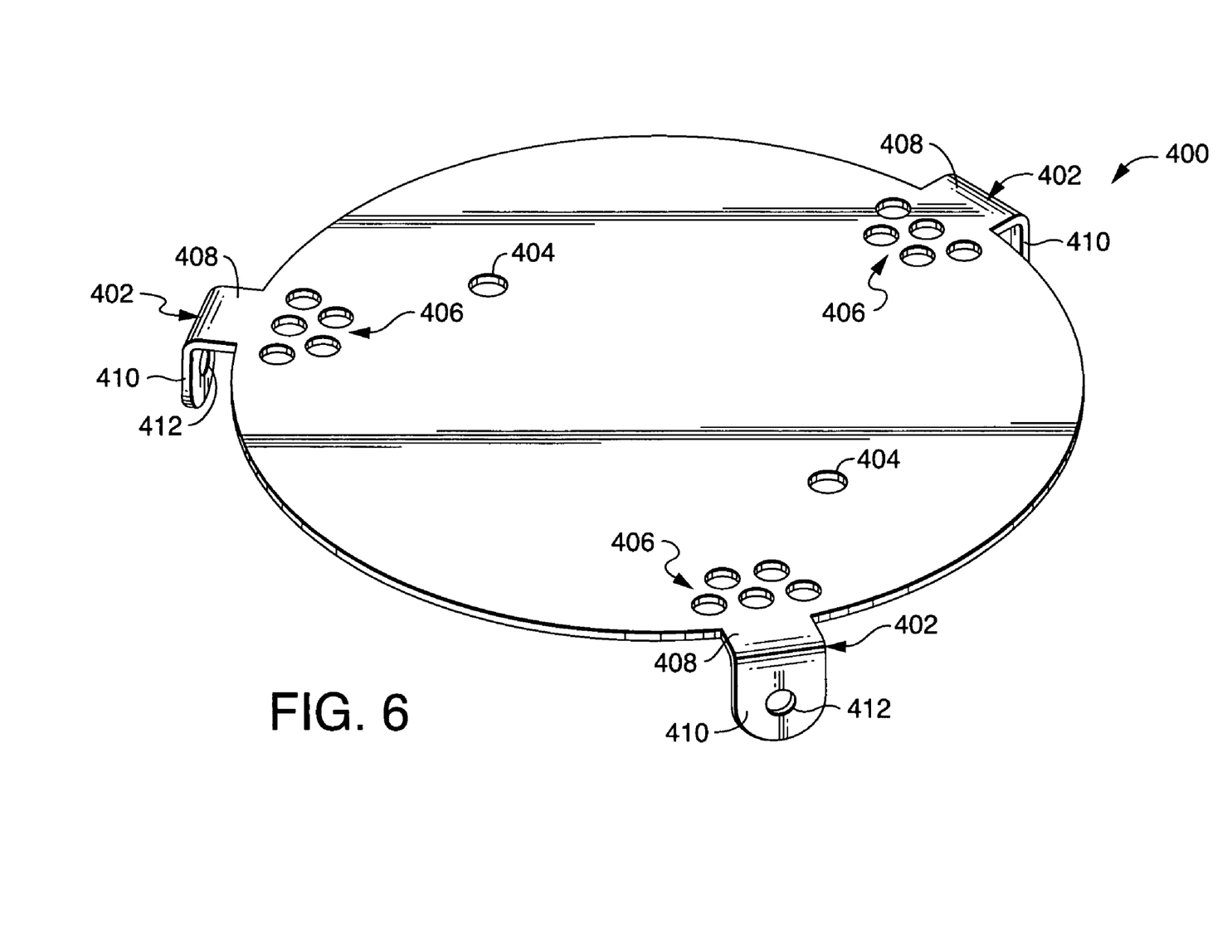
FIG. 6 is a top and side perspective view of the mounting plate of the transducer assembly of FIG. 1.
Figure 7:
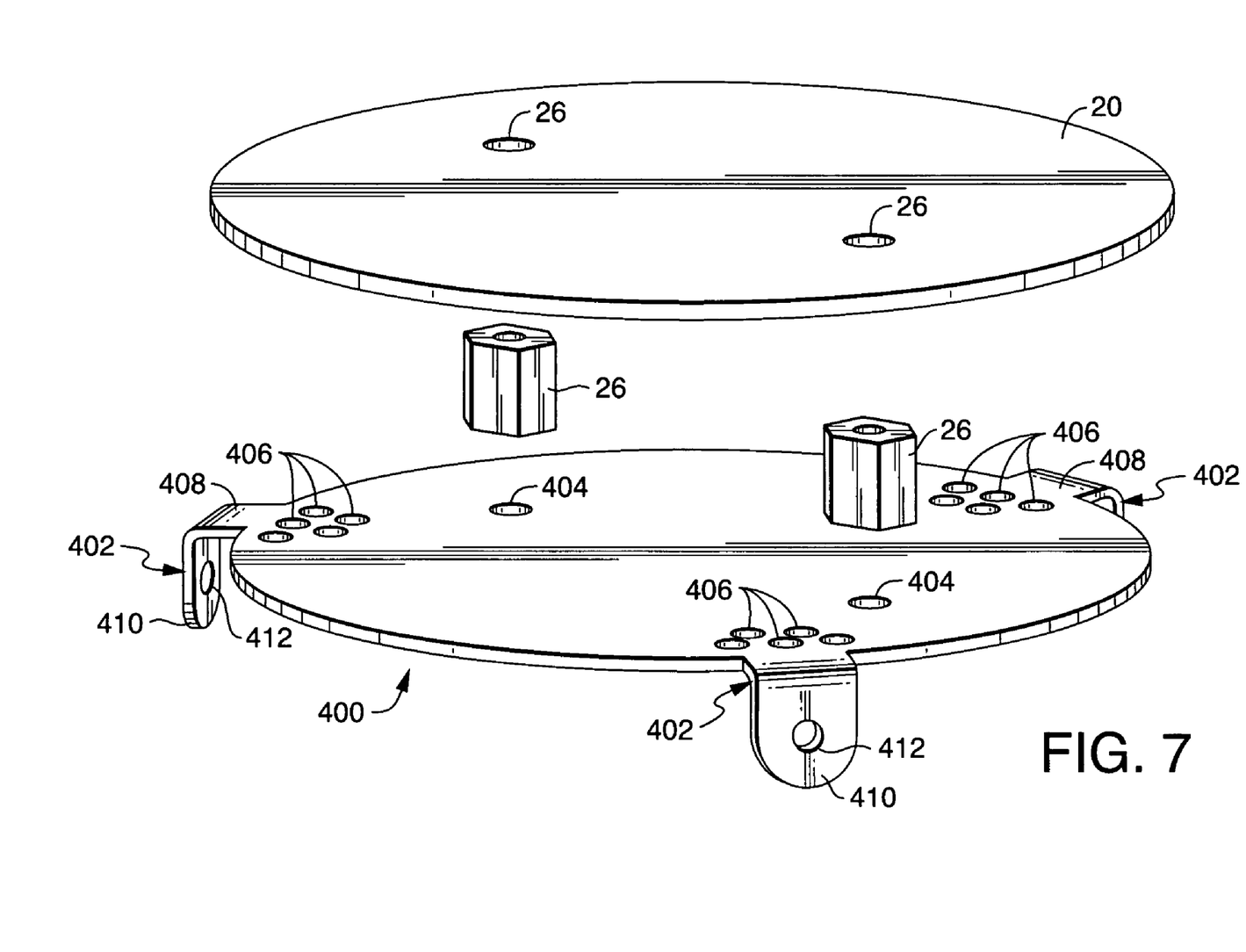
FIG. 7 is an exploded, top and side perspective view of an electronics assembly and the mounting plate of the transducer assembly of FIG. 1.

FIGS. 6–7 also show perspective views of the mounting plate 400 removed from the transducer assembly 10. The mounting plate 400 is made from suitable material, and with suitable dimensions, rigidity, and strength, so as to reduce vibrations in the attached electronics assembly 20. According to one exemplary embodiment, the mounting plate 400 is made of stainless steel and is circular. The mounting plate 400 of the present disclosure, however, could be provided in other shapes and from other materials.

As shown in FIGS. 5–8, the mounting plate 400 includes three arms 402, but could include only two arms or more than three arms. In the exemplary embodiment shown, the arms 402 extend radially outwardly from the circular mounting plate 400 and are bent so that each arm includes a first portion 408 before the bend and a second portion 410 after the bend. Each arm is bent at a right angle. The arms 402 of the mounting plate 400 are secured to a side wall of the sensor housing 12 to thereby secure the mounting plate 400 in the transducer assembly 10. In the exemplary embodiment shown, the second portions 410 of the arms 402 each include a threaded hole 412, and the arms 402 are secured to the housing 12 with screws 24 extending through holes in the housing and threadedly received in the threaded holes 412 of the arms 402.

Figure 5:
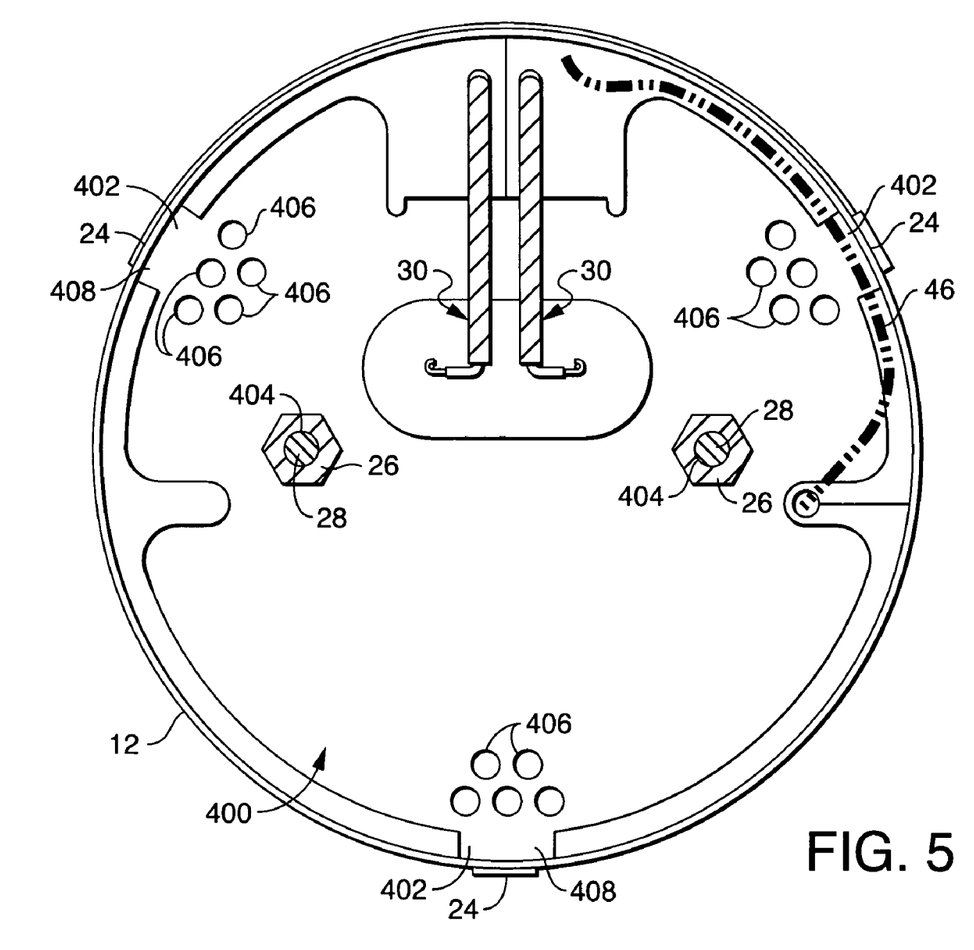
FIG. 5 is a sectional view of the transducer assembly of FIG. 1 taken along line 5—5 of FIG. 3, showing a top plane view of an exemplary embodiment of a mounting plate constructed in accordance with the present disclosure.

As shown in FIGS. 5–7, the apertures 406 of the mounting plate 400 are circular. In addition, the circular apertures 406 are arranged in two offset rows in front of each arm 402. In the exemplary embodiment shown, the mounting plate 400 includes a total of five apertures 406 for each arm 402. As previously discussed, the apertures 406 impede thermal conduction, or increase thermal resistance, between the arms 402 and the attachment point 404 of the mounting plate 400, such that temperature sensitive components connected to the mounting plate 400 through the attachment point 404 are thermally isolated. The location and the distribution of the apertures 406 depend on the location of the attachment point 404 on the mounting plate 400. That is to say that the location of the attachment point 404 is arbitrary and will dictate the distribution and design of the thermal resistance apertures 406. However, the distribution and design of the thermal resistance apertures 406 also depends on the desired rigidity of the mounting plate 400. Larger continuous apertures 406 may be desired as providing greater thermal resistance, however, such large apertures 406 may decrease the stability of the mounting plate 400.

The increased thermal resistance of the mounting plate 400 is used to increase the time for the electronics assembly 20 to react to changes in ambient temperature. In one specific application, temperature compensating electronics are located on the electronics assembly 20. The increase in thermal resistance of the mounting plate 400, hence time response to changes in ambient of the compensating circuitry, improves the temporal compensation of changes in the sensor output to changes in the ambient temperature.

Figure 1:
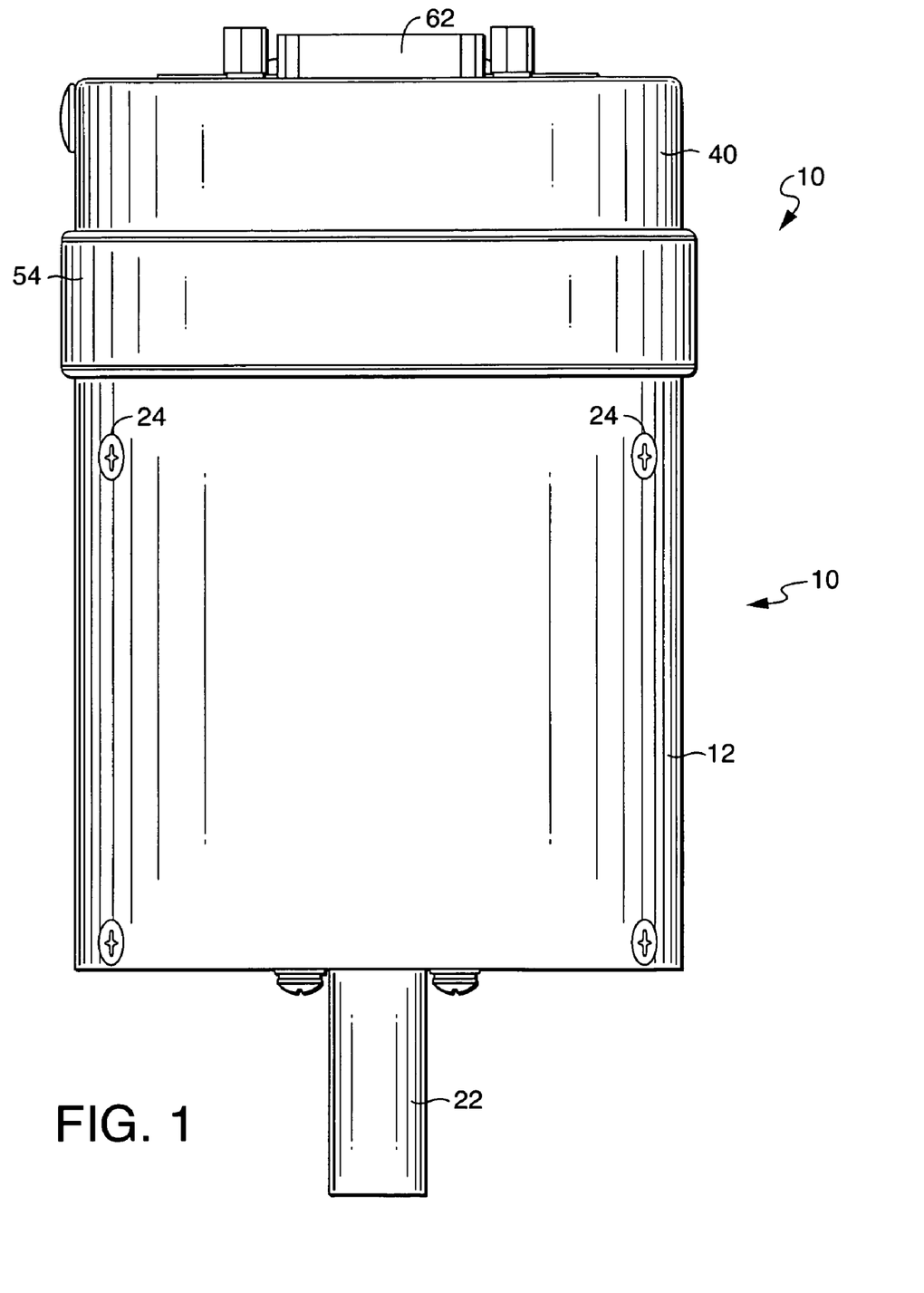
FIG. 1 is a side elevation view of an exemplary embodiment of a transducer assembly constructed in accordance with the present disclosure.
Figure 2:
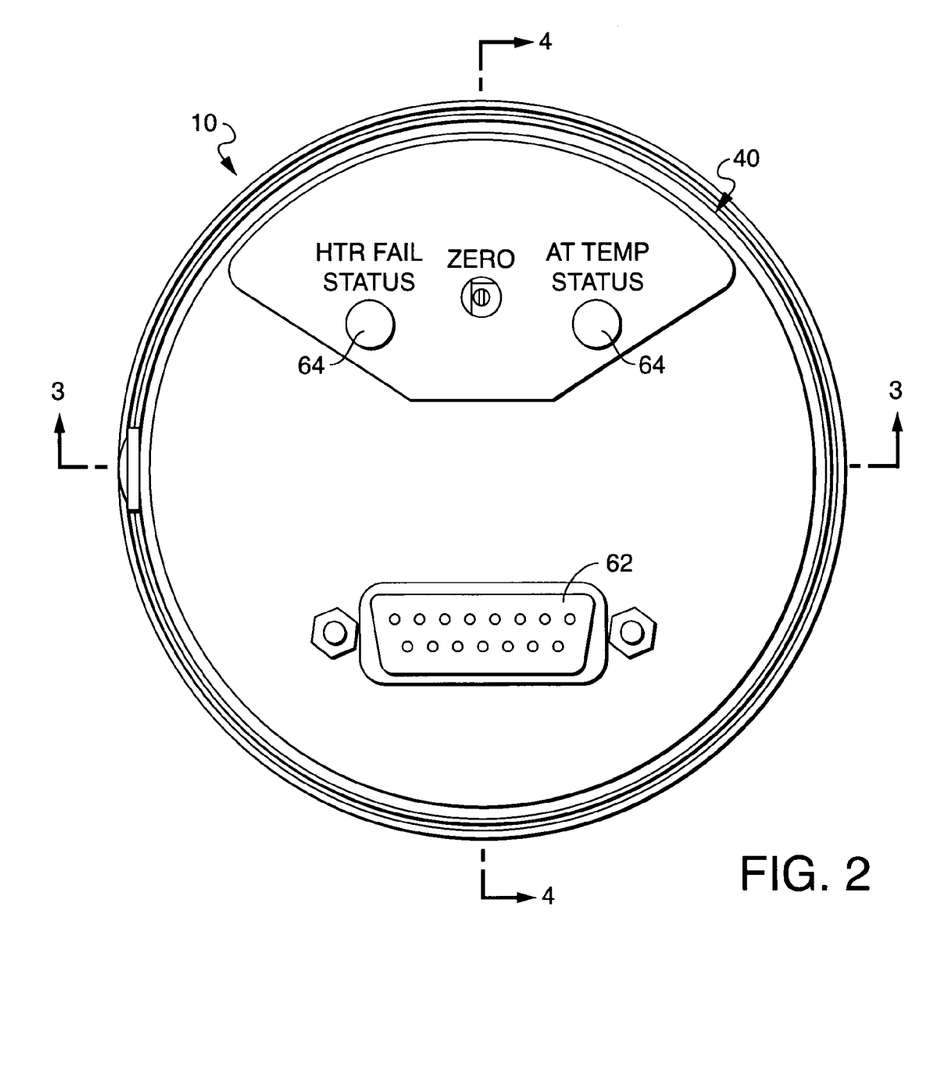
FIG. 2 is a top plan view of the transducer assembly of FIG. 1.
Figure 8:
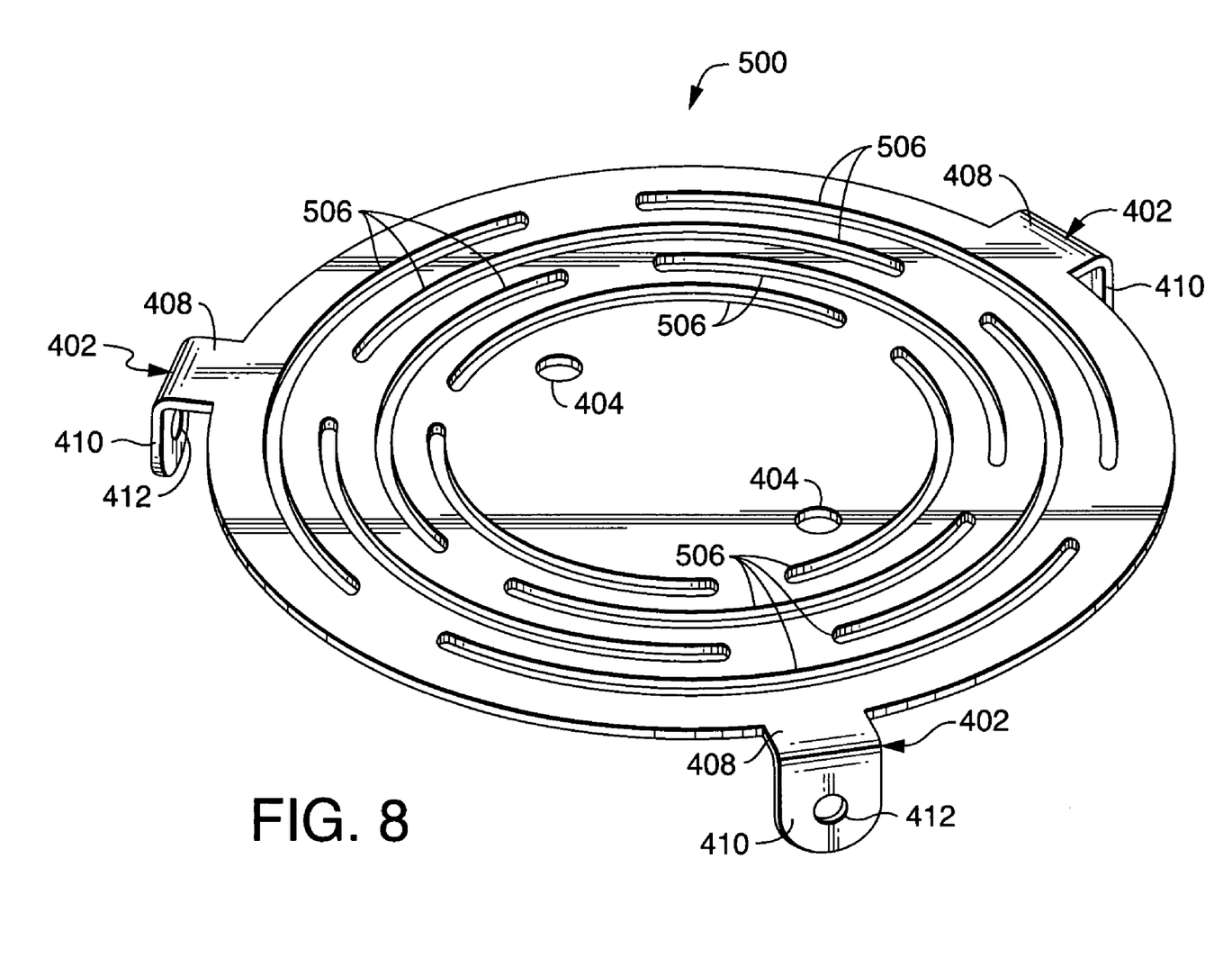
FIG. 8 is a top and side perspective view of another exemplary embodiment of a mounting plate constructed in accordance with the present disclosure for use with the transducer assembly of FIG. 1.

FIG. 8 shows another exemplary embodiment of a mounting plate 500 constructed in accordance with the present disclosure for use with the transducer assembly 10 of FIG. 1. The mounting plate 500 of FIG. 8 is similar to the mounting plate 400 of FIGS. 5–7 such that similar elements have the same reference numerals. The mounting plate 500 of FIG. 8, however, includes thermal resistance apertures 506 that are elongated and are arranged in concentric circles around a center of the mounting plate 500. In addition, the elongated thermal resistance apertures 506 are offset in successive circles to provide greater strength and rigidity to the mounting plate 500.

In any event, the thermal resistance apertures of the present disclosure can take many forms so long as the apertures do not unacceptably decrease the strength and rigidity of the plate. The thermal resistance apertures can be made during a normal stamping process of manufacturing the mounting plate, such that the addition of the aperture does not increase the cost of the plate. The addition of apertures for reducing thermal conductivity between the arms 402 and the attachment points 404 is preferably to making the arms 402 longer and/or more narrow, since longer and narrower arms 402 may allow an increased amount of shock and vibration to be transferred to a connected electronics assembly.

Referring back to FIGS. 3–5 and 7, thermally insulating spacers 26 are provided between the electronics assembly 20 and the mounting plate 400. Fasteners 28 extend through holes at the attachment point 404 of the mounting plate 400 to secure the electronics assembly 20 and the mounting plate 400. In the exemplary shown, the mounting plate 400 is provided with two of the attachment points 404, and the fasteners comprise screws 28 which are threadedly received in the spacers 26, as shown best in FIG. 3.

Figure 4:
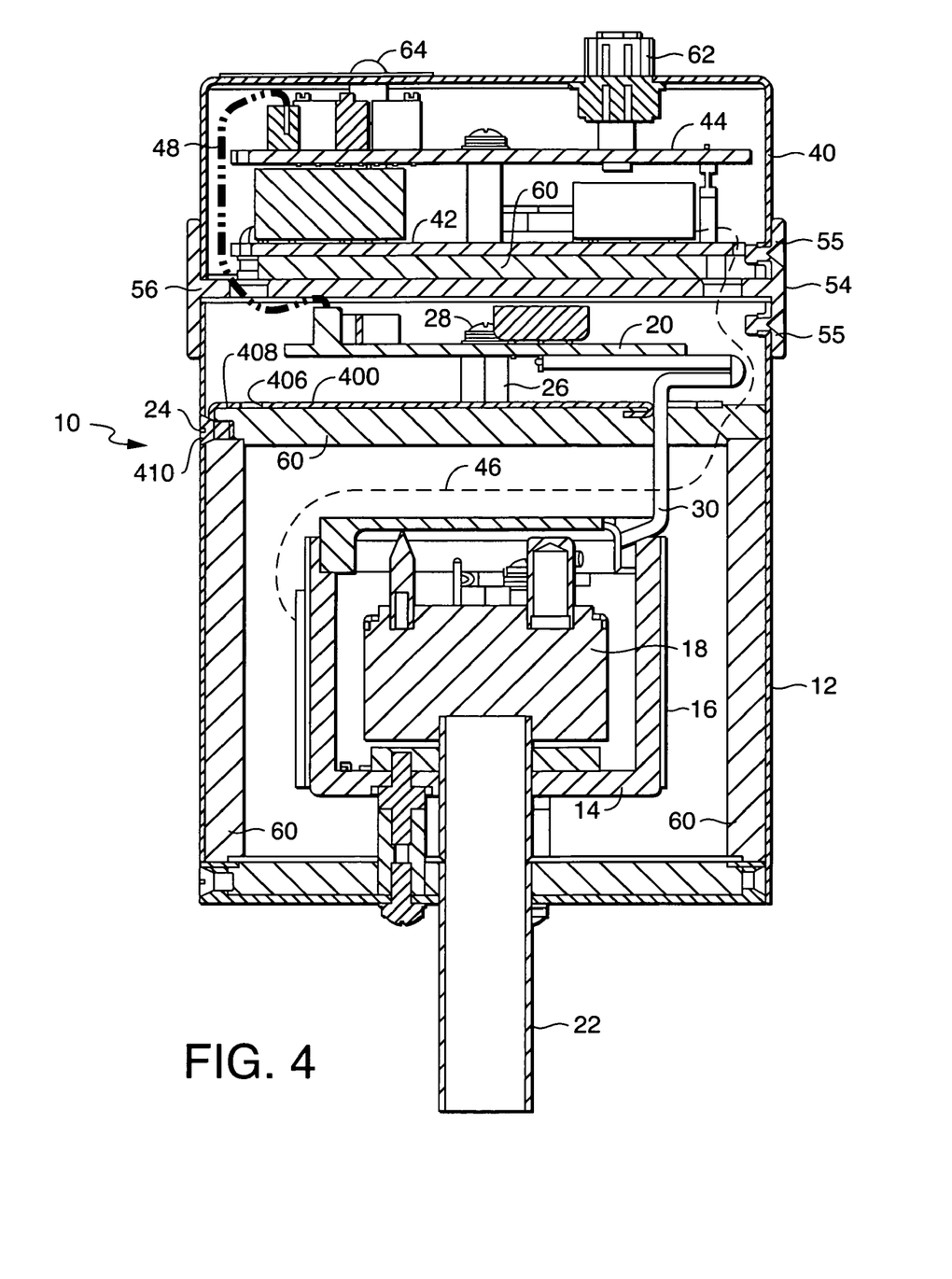
FIG. 4 is a sectional view of the transducer assembly of FIG. 1 taken along line 4—4 of FIG. 2.

In the exemplary embodiment shown, the electronics assembly comprises a sensor electronics assembly 20 having components electrically connected to the sensor 18 through at least one wire 30 for receiving signals from the sensor 18. As shown in FIGS. 4 and 5, two of the wires 30 extend from the sensor 18, through the mounting plate 400 and are connected to the sensor electronics assembly 20.

Figure 3:
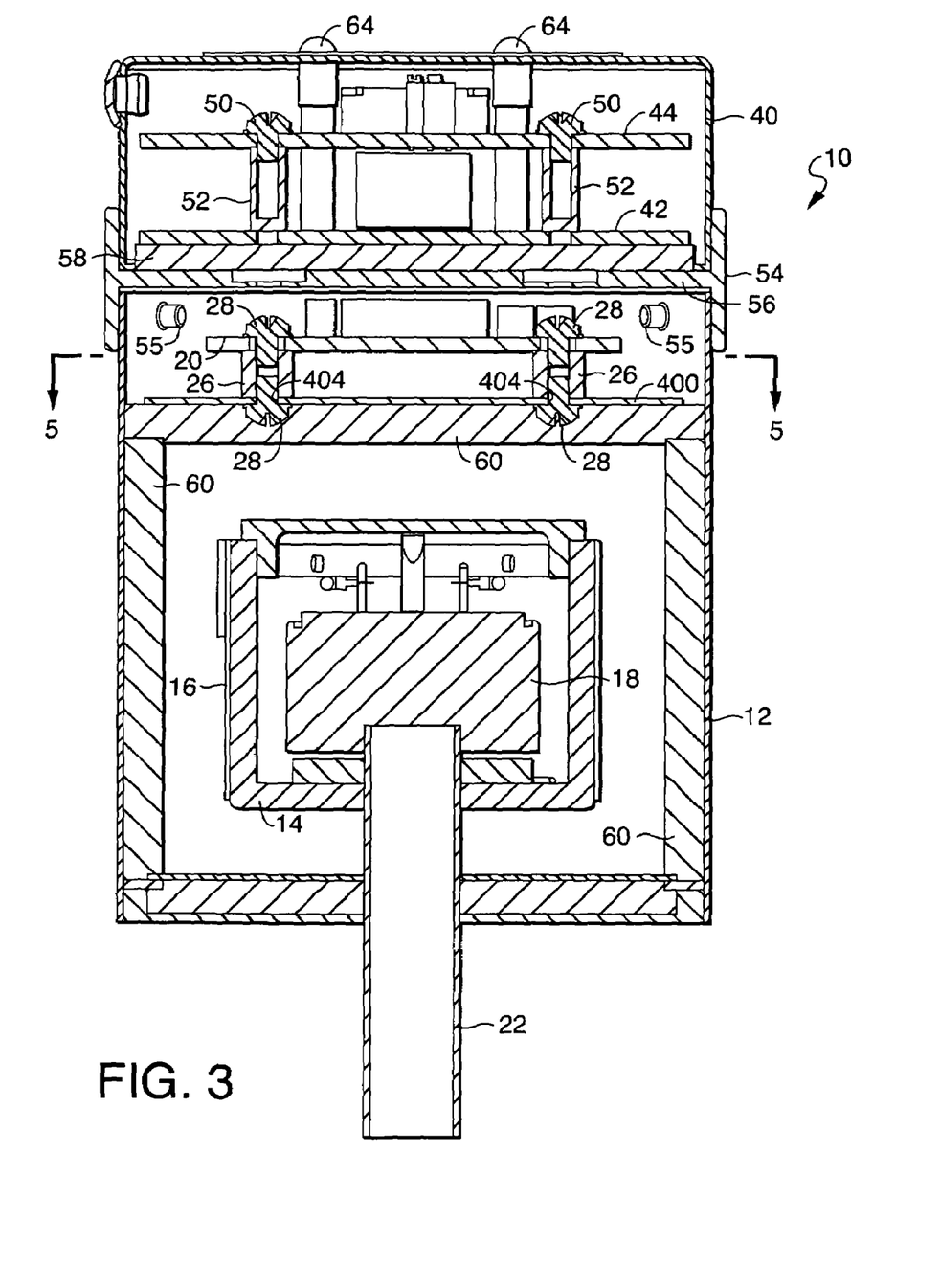
FIG. 3 is a sectional view of the transducer assembly of FIG. 1 taken along line 3—3 of FIG. 2.

As shown best in FIGS. 3 and 4, the transducer assembly 10 further includes an electronics housing 40 secured to the sensor housing 12 and containing a heater electronics assembly 42, including components coupled to the heater 16 of the heater shell 14, through a wire 46 for example, for controlling the heater 16, and an input-output electronics assembly 44 positioned within the electronics housing 40 and electrically connected to the sensor electronics assembly 20. The sensor electronics assembly 20 receives signals from the pressure sensor 18, and provides a measurement signal, through a wire 48 for example, to the input-output electronics assembly 44 in the electronics housing 40, based on pressure applied to the pressure sensor 18 through the tube 22. A temperature sensor (not shown) is located within the heater shell 14 and connected to the heater electronics assembly 42 in the electronics housing 40, through a wire (not shown) for example, so that the heater electronics assembly 42 can properly heat the heater shell 14. The input-output electronics assembly 44 includes a connector port 62 and status lights 64 extending out of the electronics housing 40.

The input-output electronics assembly 44 is secured to the heater electronics assembly 42 with fasteners, such as screws 50, and spacers 52 are provided between the input-output electronics assembly 44 and the heater electronics assembly 42. The electronics housing 40 is secured to the sensor housing 12 with a joiner 54 having a wall 56 positioned between the electronics housing 40 and the sensor housing 12. Fasteners, such as screws 55, secure the housings 12, 40 to the joiner 54. A layer of thermal insulation 58 is positioned between the wall 56 of the joiner 54 and the heater electronics assembly 42.

As shown best in FIGS. 3 and 4, the transducer assembly 10 further includes a thermal insulating blanket 60 surrounding the heater 16 and the heater shell 14. The electronics assembly 20 and the mounting plate 400 are located outside of the thermal insulating blanket 60.

While there have been illustrated and described particular embodiments of the present disclosure, it will be appreciated that numerous changes and modifications will occur to those skilled in the art. Accordingly, it is intended that the appended claims cover all those changes and modifications which fall within the scope of the present disclosure.

What is claimed is:

1. A transducer assembly comprising:
   a sensor housing;
   a heater shell located in the sensor housing;
   a heater operatively coupled to the heater shell;
   a sensor received in the heater shell;
   an electronics assembly positioned within the sensor housing, outside of the heater shell, and adapted to receive signals from the sensor; and
   a mounting plate positioned within the sensor housing, outside of the heater shell, the mounting plate having arms extending therefrom and at least one attachment point where the electronics assembly is secured to the mounting plate, wherein the arms are secured to the sensor housing and the mounting plate includes apertures adjacent to the arms for impeding thermal conduction between the arms and the attachment point.

2. A transducer assembly according to claim 1, wherein the sensor housing includes a side wall, and screws secure the arms of the mounting plate to the side wall of the sensor housing.

3. A transducer assembly according to claim 2, wherein the mounting plate includes three arms.

4. A transducer assembly according to claim 1, wherein the apertures of the mounting plate are circular.

5. A transducer assembly according to claim 1, wherein the apertures of the mounting plate are elongated.

6. A transducer assembly according to claim 1, wherein thermally insulating spacers are provided between the electronics assembly and the mounting plate.

7. A transducer assembly according to claim 1, further comprising a thermal insulating blanket surrounding the heater and the heater shell, and wherein the electronics assembly and the mounting plate are located outside of the thermal insulating blanket.

8. A transducer assembly according to claim 1, wherein the electronics assembly comprises a sensor electronics assembly having components electrically connected to the sensor through at least one wire, for receiving signals from the sensor.

9. A transducer assembly according to claim 8, further comprising an electronics housing secured to the sensor housing and containing a heater electronics assembly including components coupled to the heaters of the heater shell for controlling the heaters.

10. A transducer assembly according to claim 9, further comprising an input-output electronics assembly positioned within the electronics housing and electrically connected to the heater electronics assembly and the sensor electronics assembly, and wherein the input-output electronics assembly includes a connector port extending out of the electronics housing.

11. A transducer assembly according to claim 10, wherein the electronics housing is secured to the sensor housing with a joiner having a wall positioned between the electronics housing and the sensor housing.

12. A transducer assembly according to claim 11, further comprising a layer of thermal insulation positioned between the wall of the joiner and the heater electronics assembly.

13. A transducer assembly according to claim 1, wherein the sensor comprises a capacitive pressure sensor and the assembly further includes a tube connected to the pressure sensor and extending out of the heater shell and the sensor housing for connection to a source of fluid.

14. A transducer assembly according to claim 1, wherein the arms extend radially outwardly from the mounting plate and are bent so that each arm includes a first portion before the bend and a second portion after the bend.

15. A transducer assembly according to claim 14, wherein each arm is bent at a right angle.

16. A transducer assembly according to claim 14, wherein the second portions of the arms each include a threaded hole, and the arms are secured to side walls of the sensor housing with screws extending through holes in the side wall and threadedly received in the threaded holes of the arms.

17. A transducer assembly according to claim 1, wherein the apertures of the mounting plate are circular and are arranged in two offset rows in front of each arm.

18. A transducer assembly according to claim 1, wherein the apertures are elongated, arranged in concentric circles around a center of the mounting plate, and are offset in successive circles.

19. A transducer assembly according to claim 1, wherein the mounting plate is circular.

20. A transducer assembly according to claim 1, wherein the mounting plate is made of stainless steel.

* * * * *